April 16, 1968 J. I. HELLER 3,378,645

RECORDED DIELECTRIC MEDIUM AND RECORDING AND PLAYBACK METHODS AND APPARATUSES

Filed Sept. 29, 1964

INVENTOR.
JOSEPH I. HELLER
BY
Kinschstein, Kinschstein & Ottinger
ATTORNEYS

United States Patent Office 3,378,645
Patented Apr. 16, 1968

3,378,645

RECORDED DIELECTRIC MEDIUM AND RECORDING AND PLAYBACK METHODS AND APPARATUSES

Joseph I. Heller, Brooklyn, N.Y., assignor to Belock Instrument Corporation, College Point, N.Y., a corporation of New York Filed Sept. 29, 1964, Ser. No. 400,184
19 Claims. (Cl. 179—100.1)

This invention relates to a recorded dielectric medium and to recording and playback methods and apparatuses for the same.

In my United States Letters Patent No. 3,057,966 for "Dielectric Recording and Playback Apparatus and Method," it was proposed that dielectric recording could be advantageously utilized for entraining on tape, in the form of variable capacity, signals which had been translated from any information signal so that at any later time the dielectrically recorded tape might be fed through a playback apparatus to reproduce the information signal.

In general, my previous patent disclosed the production of an elongated tape sandwich having a longitudinally continuously variable capacitance, whose capacitive value was a function of the information signal. The recording apparatus made provision for input signal circuit means which in response to the information signal generated electrostatic charges of varying intensities across two opposed recording electrodes separated by a narrow gap. A tape, composed of dielectric material, was passed through the gap and a train of electrostatic charges was thereby impressed longitudinally thereon, corresponding to the information signal. The tape was then passed through a cloud chamber containing powdered dielectric particles which were attracted by and thus deposited upon the tape upon the electrostatically charged areas in amounts varying according to the intensity of the electrostatic charges. The dielectric constant of the dielectric tape was less than the dielectric constant of the powdered particles. A second dielectric layer thereafter was fixed, as by spraying or by heat sealing a different tape, over the tape carrying the dielectric powdered particles, and a thin tape sandwich was thus formed which permanently retained the powdered particles in place between two dielectric layers.

For playback, a dielectric recording made in the foregoing manner was passed through a gap between a pair of fixed-position pickup electrodes. Output signal circuit means was provided to detect the capacitive variations of the dielectric recording as it passed between the pickup electrodes and to translate these variations into an output electric signal. The original input information signal was thus reproduced.

Utilizing the same electrostatic principles, I now propose a different dielectric medium and different recording and playback methods and apparatuses which result in greatly increased faithfulness between the input information signal and the reproduced information signal.

It is the primary object of my invention to provide a recorded dielectric medium and recording and playback methods and apparatuses wherein accurate reproduction of an information signal is not effected by the lack of constant thickness of the dielectrically recorded medium.

It is another object of my invention to provide a recorded dielectric medium and recording and playback methods and apparatuses wherein noise and spurious signals caused by the unavoidable variations in the thickness of the recorded medium are minimized.

It is another object of my invention to provide a recorded dielectric medium of the character described wherein the medium constitutes twin series-connected tape-carried capacitances variable along their lengths and wherein the variations in said capacitances can be measured by applying spaced, side-by-side electrodes of a playback head to a dielectric face of the recorded medium.

It is yet another object of my invention to provide a playback apparatus for the aforesaid recorded medium wherein a playback head including a pair of side-by-side twin electrodes placed athwart the tape is provided to measure the variations in capacitance along the length of the medium by the application of the faces of said electrodes directly to one side only of the tape so as to eliminate air space between the recorded medium and the electrodes.

In a dielectric recording as disclosed in my previous patent, the tape sandwich will tend to vary in thickness because of the entrapment of varied quantities of dielectric powdered particles within the tape sandwich and the difficulty of either spraying a dielectric layer or heat sealing another dielectric tape on to the particle-bearing tape while maintaining the tape sandwich at a constant thickness.

When the recording is subsequently passed through a fixed-distance gap between pickup electrodes, air spaces between the electrodes and the recording will introduce random capacitances into the playback circuit which significantly reduce the quality and faithfulness of the reproduced signal.

In this connection, it will be recalled that in a series capacitance circuit as exists through the various dielectric materials in the tape sandwich between the pickup electrodes, the equivalent capacitance is determined according to the relation $$\frac{1}{C_t}=\frac{1}{C_1}+\frac{1}{C_2}+\dots$$

It can be shown that air, having the lowest dielectric constant of 1, interposed between the tape sandwich and the pickup electrodes will often cause a greater modulation in the circuit than the deposited powder particles.

It might be thought that biasing the pickup electrodes toward one another would squeeze the tape medium between them so as to eliminate these air spaces. But this is impractical since the tape sandwich would have to be gripped so firmly that there would be too much drag in the system and the medium would be stretched or mutilated. Further, any relative movement of the electrodes would result in large, unwanted modulation in the playback circuit.

In the preparation of my new recorded dielectric medium, I electrostatically charge and deposit powdered particles along a dielectric tape in a manner similar to that previously described. That is, a trail of electrostatic charges is imposed by a pair of opposed recording electrodes longitudinally along the tape as a function of an information signal. The charged tape is then fed through a station, e.g. a cloud chamber, where powdered dielectric electrostatically charged particles are attracted to and deposited on the electrostatically charged areas on the tape in accordance with the intensity of the electrostatic charges on the tape.

In contrast to previous procedure wherein a dielectric layer was subsequently applied over the particle-bearing tape and pursuant to my present invention, an electrically conductive layer next is applied over the particle-bearing face of the tape.

I thereafter perform the playback function by passing the tape sandwich formed in the manner described in bearing contact with and over a pair of spaced side-by-side pickup electrodes, i.e. a pair of pickup electrodes that press against the dielectric face of the tape sandwich and are arranged transversely to the longitudinal path of travel of the recorded medium. A series capacitance circuit is thereby closed between the pickup electrodes through the tape, initiating at one electrode, then passing through the dielectric tape abutting the face of the one electrode, then passing through the dielectric powdered particle deposit on the tape in registry with the one electrode face, then passing through the conductive layer applied over the powdered deposits, then passing through the dielectric powdered particle deposit on the tape in registry with the second electrode face, then passing through the dielectric tape likewise in registry with the second electrode face and finally arriving at the second electrode itself. A series capacitance circuit segment is thus achieved, with the dielectric tape and the dielectric powder deposit in one area and in registry with the face of one electrode forming with this conductive layer and the one electrode a first capacitor that is series connected by said conductive layer to a second capacitor constituted by the dielectric tape and the dielectric powder deposit in another area in registry with the face of the other electrode sandwiched between the conductive layer and the other electrode.

By feeding the recorded medium so that it makes a bend over the electrode faces with the deposit-free surface of the dielectric tape in contact with the electrode faces, all air space between the tape sandwich and the pickup electrode faces is eliminated, and all random variations in the capacitance of the playback circuit due to the presence of air spaces are prevented. Thus there is no possibility that the presence of air in the capacitance circuit will modulate the playback signal.

My invention accordingly consists in the features of construction, combination of elements, arrangements of parts and series of steps which will be exemplified in the devices and methods hereinafter described and of which the scope of application will be indicated in the appended claims.

In the accompanying drawings in which is shown one of the various possible embodiments of my invention, FIG. 1 is a longitudinal vertical section of the recording apparatus and illustrating the method of impressing electrostatic charges on the tape, depositing powdered dielectric particles thereon and applying an electrically conductive layer thereto;

Figures 1, 2, 3, 4:
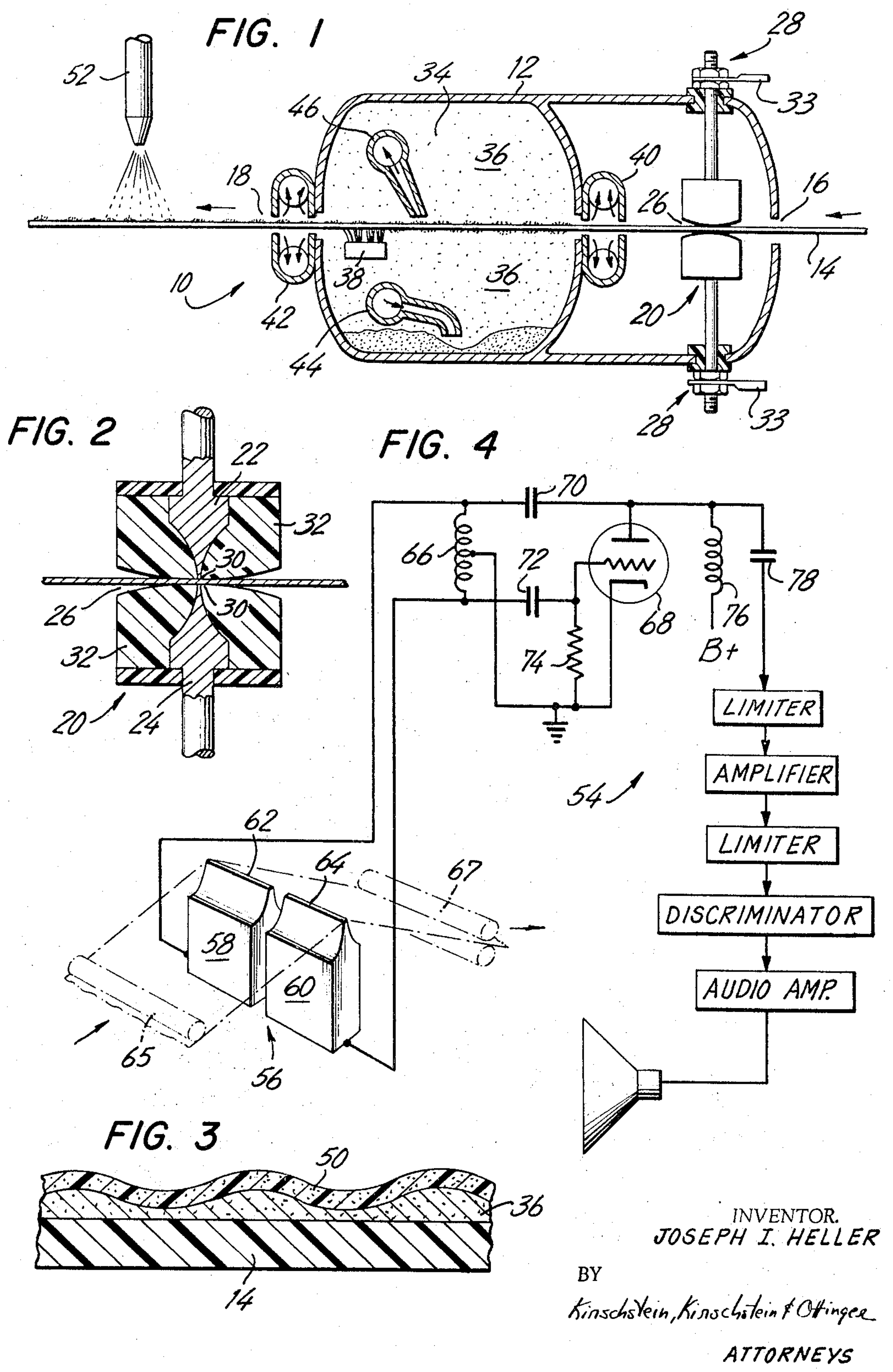
FIG. 2 is an enlarged longitudinal cross-section of a pair of opposed recording electrodes utilized for electrostatically charging the tape.
FIG. 3 is an enlarged longitudinal cross-sectional view of a small length of the recorded medium and illustrating its sandwich construction.
FIG. 4 is a partially perspective and schematic view of the playback circuit and illustrating the playback electrodes in contact with the recorded dielectric medium.

Referring now to the drawings, and especially to FIGS. 1 and 2, I provide a recording apparatus including an input signal circuit which impresses a trail of electrostatic charges longitudinally along a dielectric tape and then deposits powdered dielectric particles upon the electrostatically charged areas on the tape. The aforesaid method and apparatus are set forth in detail in my United States Letters Patent No. 3,057,966, and will only be briefly repeated here for completeness.

The recording apparatus, generally designated by the reference numeral 10, includes a housing 12 which encloses and supports various operative components. An elongated thin flexible dielectric tape 14 of plastic is fed through the housing 12 at a constant speed. Said tape may be formed of any electrically nonconductive conventional plastic, e.g., a polyester; the same being well known to those skilled in the art. The thickness of the tape may be in the order of ¼ mil.

The tape 14 enters the housing on one side thereof at an ingress port 16, travels longitudinally through the housing over a linear path of travel and exits from the housing through an egress port 18.

The tape 14 inside the apparatus housing and adjacent the ingress port 16 passes through a recording head 20 comprising two opposed recording electrodes 22, 24 separated by a gap 26 of fixed distance, the electrodes having faces which are oriented transversely of the tape and are located on opposite broad faces thereof. The electrodes 22, 24 are suitably mounted on the apparatus housing as at 28.

The electrodes herein illustrated have opposed "razor-edge" faces 30, the electrodes being jacketed in insulating material 32 except for said faces which are respectively flush with the facing surfaces of the insulating material. Blunt faced electrostatic charging electrodes, or even multiple electrodes are adaptable for use with the recording apparatus.

A signal voltage is impressed across the electrodes 22, 24 by an input circuit (not shown) in accordance with an input information signal. The input information signal, which is any type of information signal, is translated into a varying voltage by well known circuit means. The input signal may be an amplitude modulated carrier or a frequency modulated carrier or pulses. The input signal circuit is electrically connected to the recording electrodes by terminal lugs 33. One of the electrodes 24 functions as a cathode and the other electrode 26 functions as an anode to electrostatically charge the dielectric tape 14.

In an alternate form of electrostatic recording, shown for example in FIG. 11 of my aforesaid patent, the cathode electrode is located above a pair of parallel electrically nonconductive guide plates separated from one another by a gap in the order of 0.000001″. The gap is oriented to intersect the path of travel of the tape and serves to direct the flow of electrons between the cathode and anode. The cathode electrode is located at the end of the gap distant from the tape and has an electron emissive surface facing the gap. If the electrode is in the form of a hollow cylinder, it may encompass a filament heater having a suitable electrical power supply source. The anode electrode is adjacent the opposite broad face of this tape. A conventional cathode-to-anode voltage in the range of 200 volts is applied across the electrodes.

In another alternate embodiment of the recording head, shown, for example, in FIG. 12 of my aforesaid patent, a corona voltage in the range of 30,000 volts is applied to a pair of cold electrodes to ionize the interelectrode space, the tape being passed through said space so as to electrostatically charge the same.

A transformer may be used for imposing the signal voltage upon the DC electrode charging voltage, whether said voltage electrostatically charges the tape by dielectric stress or by electronic emission or by corona discharge. The signal voltage is impressed across the primary winding of the transformer and is inductively impressed on its secondary winding, which latter winding is in line with the electrode charging voltage line.

There is thus induced in the tape between the electrode faces a dielectric stress as a function of the input signal voltage. As the tape moves through the gap between the recording electrodes a latent trail of electrostatic charges is imposed thereon varying longitudinally of the tape as a function of the signal and extending from one face of the tape to the other face.

The tape 14 in its travel through the housing 12 then passes through a particulate developing station for the latent electrostatic trail, for example, a cloud chamber 34 formed by internal walls of the housing 12. The chamber contains an air borne suspension of minute finely divided dielectric powder particles 36. The size of said particles is in the order of millimicrons and the particles can therefore easily be carried in the atmosphere of the chamber.

The finely divided powder particles 36 in the chamber 34 are made from a dielectric material having triboelectric characteristics. Said particles are electrostatically charged by their frictional interaction and movement while suspended in air and are attracted to and deposited upon the electrostatically charged areas entrained longitudinally along the tape in accordance with the intensity of charge of any particular area, as said tape feeds through the chamber. That is to say, the more highly electrostatically charged areas attract and pick up a greater quantity of powder particles and the less intensely charged areas pick up proportionately lesser quantities of particles so that a trail of particles is formed whose quantity is controlled by the trail of electrostatic charges. The particle size is preferably as fine as possible to insure high resolution of recording and reproduction.

It is appropriate to observe at this point that because in the illustrated form of my invention the dimensions and area of the faces of the respective recording electrodes remain constant during the electrostatic charging operation, the width of the powder particle deposit also remains the same. A variation in the intensity of the electrostatic charge therefore varies only the thickness of the deposit. However, it is within the scope of my invention to vary the width of the deposit so that in a generic sense it is the transverse cross-section of the deposit that varies as a function of the signal being recorded.

Since it is desired to deposit powdered particles on only one side of the tape, a brush 38 located adjacent the path of travel of the tape and within the chamber is utilized to sweep clean the powdered particles from one side of the tape and leave this side deposit-free.

The powder particles 36 can be circulated between the chamber and a replenishing source of supply (not shown). Hooded air intake ducts 40, 42 are connected to a pump (not shown) and are located outside the chamber respectively at the ingress port and egress port of the chamber to minimize the loss of powder through said ports. An air exhaust nozzle 44 directed at the floor of the chamber where some particles have settled provides a mild turbulence to keep the greater portion of the particles in air-borne suspension. An air intake nozzle 46 scavenges loose powdered particles from the tape which are not held by electrostatic attraction.

As will be explained more fully subsequently, the dielectric tape and the deposits of dielectric powder particles on a single face only of said tape constitute a series capacitance circuit. The total series capacity of this circuit, i.e., the capacity of the tape plus the capacity resulting from the addition of the powder to the tape, is a fraction the numerator of which is the product of the individual capacities and the denominator of which is the sum of the capacities. As the dielectric constant of the tape increases, the ratio of the capacitance of the tape to the capacitance of the tape plus powder increases and as the dielectric constant of the powder decreases, the mentioned ratio also increases. Such an increase in this ratio is generally desirable since it provides a greater swing of signal in the reproducing apparatus.

The capacitance of the tape is practically constant due to the substantially uniform thickness of the tape. The tape should be kept as thin as possible consistent with its strength requirements to keep its capacitance at a minimum. It is desirable to have the capacitive effect of the addition of the powder particles as great as possible relative to the constant capacitance of the tape so that the capacitive variations along the tape are substantial in order that a high signal-to-noise ratio can be achieved along with good reproductive fidelity. Thus, the materials for the tape and for the powder are desirably to be chosen so that the dielectric constant of the tape is relatively high and the dielectric constant of the powder particles is relatively low.

The tape and powder will thereby comprise the dielectric component of a capacitor which varies in its capacitance along its length. This variability has a range depending upon the quantity, i.e., the transverse cross-section, of the deposited powder particles as well as the dielectric constant of said particles. The maximum degree of variability depends upon the utilization of a powder particle material with the lowest attainable dielectric constant. The foregoing factors are to be considered primarily in connection with the use of the dielectric medium to reproduce information signals with high fidelity. It should be noted, however, that where a crude pulse signal is to be imparted to the dielectric recording, the value of the dielectric constant is no longer critical since high fidelity is then not a requisite of the system.

It may be mentioned at this point that where the signal is an amplitude modulated carrier or an amplitude varying signal the cross-sections of the deposit will vary as a function of the instantaneous value of the signal. In the case of a frequency modulation signal the cross-section of the deposit will vary as a function of the instantaneous value of the frequency modulated carrier.

The tape may be formed from polystyrene film, which material has a dielectric constant of 2.6 and a very high resistance. A dielectric material for the tape having a high resistance enables it to store an electrostatic charge for a sufficient period of time for the tape to pass from the recording head to the powder cloud chamber without substantial loss of charge. Regenerated cellulose, cellulose acetate, cellulose acetate butyrate, cellophane and Mylar, a polyester film that is the condensation product of ethylene glycol and terephthalic acid, are typically suitable for this purpose.

The powder particles, as had been mentioned, are to be chosen from the triboelectric series and may have a particle size of about 5 to 10 millimicrons. Conventional xerographic toners can be utilized, including silicon dioxide, talc, synthetic resins, zinc stearate and Cab-O-Sil, a pyrogenic colloidal silica manufactured by the Cabot Corporation, 125 High St., Boston, Mass.

In addition to the application of the powder particles to the tape by the illustrated cloud chamber, the particles may be applied to the tape by any of the conventional and well known xerographic developing methods for latent electrostatic charges. For example, the particles may be applied by the cascade method, by the use of a liquid bath, by the use of a liquid spray, and by the magnetic brush method.

As the tape 14 leaves the cloud chamber 34 through the egress port 16, a conductive layer 50 is applied over the particles and onto the tape and thereby fixes the deposits of powder particles in place on the tape. The conductive layer 50 may comprise finely divided particles of a highly conductive metal such as copper, silver or aluminum in a conventional solid flexible binder as for example, rosin, synthetic resin, shellac or lacquer. A conductive layer containing about 50% by weight metal particles is suitable. The conductive layer 50 may be applied by spraying the particles and binder in a volatile solvent medium for the binder, e.g., butyl acetate, through a spray nozzle 52 against the particle bearing face of the tape. The solvent then evaporates leaving the conductive layer over the particles which latter are fixed thereby against the tape. The conductive particles do not penetrate the particle deposit. The conductive layer may also be applied by other methods such as by a doctor blade. Alternatively, the conductive layer can be applied in a form of a thin electrically conductive tape (electrically conductive particles dispersed in a solid flexible binder in sufficient quantity to render the applied tape electrically conductive) which is adhered to the carrier tape over its particle bearing face. It is desirable that the conductive layer be of uniform thickness, be of uniform conductivity and solidify quickly in place.

The recorded dielectric medium is thus completed and may be appropriately stored in any convenient manner prior to playback.

FIG. 4 illustrates a conventional playback circuit 54 utilizing a novel playback head 56. It should be understood that other conventional playback circuits may be substituted for the playback circuit 54 illustrated, within the scope of the present invention.

The playback head 56 comprises two side-by-side spaced parallel playback electrodes 58, 60. The electrodes may be spaced apart in the order of 1/16". The electrodes have their pickup faces, respectively 62, 64, oriented transversly of the length of the tape sandwich so that they abut, so to speak, side-by-side (athwart) portions of the broad nonconductive deposit-free face of the recorded medium. The medium is fed through a bend over the electrodes 58, 60 at a constant speed so that there is no space between the electrode pickup faces 62, 64 and the nonconductive face of the recorded medium. An idler roller 65 and feed rollers 67 guide the medium through its path of travel which bends over said pickup faces.

The electrodes can readily measure the capacitance at any point along the length of the elongated medium, as the medium passes through the playback head. The capacitance circuit formed between the electrodes and the recorded medium initiates at the face of any one electrode, then continues in series through that portion of the dielectric tape abutting said face, then through the cross-section of the deposit of powdered particles in alignment with said electrode face and said portion of dielectric tape, then across the conductive layer, then through the deposit of powdered particles in transverse alignment with the face of the other electrode, then through the portion of the dielectric tape abutting and in transverse alignment with said latter face and then finally arrives at the face of the second electrode itself. In effect two capacitors are thereby formed. The first constitutes one electrode, the portions of the dielectric tape and powder deposit registered with said one electrode and the conductive layer. The second constitutes the other electrode, the portion of the dielectric tape and powder deposit registered with said other electrode and the conductive layer. The conductive layer connects the two capacitors in series. A series capacitance circuit segment thereby is formed from one electrode face through the recorded medium and back to the second electrode face. By the foregoing arrangement, both electrodes are located with their faces abutting only one side, the deposit-free side, of the recorded medium and there is no capacitance of any air space interposed between the medium and the electrodes to interfere with the fidelity of the reproduced signal.

The remainder of the playback circuit 54 need only be described briefly. The playback head 56 is connected across an inductance coil 66 and forms therewith a resonant circuit which is tuned to different frequencies by the moving recorded dielectric medium. The resonant circuit acts on a conventional oscillator circuit which includes a vacuum tube 68 having its cathode both grounded and connected to an intermediate point on the coil 66. The anode of the tube is coupled through a capacitor 70 to one terminal of the inductance coil 66. The other terminal of the coil is coupled through another capacitor 72 to the control grid of the vacuum tube 68.

A grid resistor 74 interconnects the control grid and the cathode of the vacum tube 68. Anode potential is supplied from a suitable D.C. source B through an inductance coil 76. Thereby the variable capacitance signal present in the dielectric medium is transduced into a frequency modulation at the output of the oscillator circuit.

The output from the vacuum tube 34 is coupled to an FM receiver through a capacitor 78 whereby to provide a signal modulated output. Typically the receiver includes a limiter which is connected to an amplifier, which is connected to a second limiter, which is connected to a discriminator. The output of the discriminator is fed through an amplifier and if audible is reproduced by a loud speaker.

I have disclosed to a reader skilled in the art a new and important recorded dielectric medium and recording and playback methods and apparatuses. The recorded dielectric medium has been constructed and arranged in a manner such that the electrode faces of the playback head are applied to only the deposit-free face of the medium while yet still measuring the variable capacity of the medium as it passes through the playback head. This has been accomplished by providing a dielectric sandwich comprising a dielectric tape, deposits of dielectric powder particles, and an electrically conductive layer. I have thereby eliminated the use of a playback head wherein there is a gap of fixed distance through which the recorded medium must pass. By passing the medium through a bend over the side-by-side spaced playback electrodes, air space between the electrodes, air space between the electrodes and the recording medium has been eliminated so that a faithful and high quality reproduction of the input information signal is reproduced.

It thus will be seen that I have provided devices and methods which achieve the several objects of my invention and which are well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and useful and desire to secure by Letters Patent:

1. A recorded dielectric medium for reproducing an information signal, said medium comprising a thin dielectric carrier, a trail of deposited quantities of dielectric powder particles on a face of the carrier, the transverse cross-section of the trail varying as a function of the information signal, and an electrically conductive layer superposed on the trail of deposited quantities.

2. A recorded dielectric medium for reproducing an information signal, said medium comprising a thin dielectric carrier, a trail of deposited quantities of di-electric powder particles on a face of the carrier, the transverse cross-section of the trail varying as a function of the information signal, and an electrically conductive layer superposed on the trail of deposited quantities and securing the particles onto the carrier.

3. A recorded dielectric medium as set forth in claim 2 wherein the carrier comprises a thin elongated flexible tape and the conductive layer is flexible.

4. A recorded dielectric medium as set forth in claim 2 wherein the dielectric constant of the powder particles is relatively low and the dielectric constant of the carrier is relatively high.

5. A recorded dielectric medium as set forth in claim 2 wherein the electrically conductive layer comprises finely divided particles of a highly electrically conductive metal dispersed in a binder.

6. A recorded dielectric medium as set forth in claim 2 wherein the other face of the carrier is deposit-free.

7. A recorded dielectric medium for reproducing an information signal, said medium comprising a thin dielectric carrier, a trail of deposited quantities of dielectric powder particles on a face of the carrier, the thickness of the trail varying as a function of the information signal, and an electrically conductive layer superposed on the trail of deposited quantities.

8. A method for forming a recorded dielectric medium comprising the steps of:

(a) providing a dielectric carrier;
(b) electrostatically charging successive areas on the carrier in accordance with an information signal;
(c) depositing quantities of powder dielectric particles on successive areas of a face of the carrier as a function of the change in intensity of the electrostatic charges on the successive areas; and
(d) superposing an electrically conductive layer over the particle-bearing face of the carrier.

9. A method for forming a recorded dielectric medium comprising the steps of:

(a) providing an elongated thin flexible dielectric tape;
(b) electrostatically charging longitudinally successive areas on the tape in accordance with an information signal;
(c) depositing quantities of powder dielectric particles on successive areas of a face of the tape as a function of the change in intensity of the electrostatic charges on the successive areas; and
(d) superposing an electrically conductive flexible layer over the particle-bearing face of the tape.

10. A method for forming a recorded dielectric medium comprising the steps of:

(a) providing an elongated thin flexible dielectric tape;
(b) electrostatically charging longitudinally successive areas on the tape in accordance with an information signal;
(c) passing the tape through a developing station to deposit quantities of powdered dielectric particles on the successive areas of a face of the tape as a function of the change in intensity of the electrostatic charges on the successive areas; and
(d) fixing an electrically conductive flexible layer over the particle-bearing face of the tape.

11. A playback apparatus for reproducing an information signal from a recorded dielectric medium comprising a thin dielectric carrier, a trail of deposited quantities of dielectric powder particles on a face of the carrier, the other face of the carrier being deposit-free, the transverse cross-section of the trail varying as a function of the information signal, and an electrically conductive layer superposed on the trail of deposited quantities: said playback apparatus including a playback circuit, a playback head and means for feeding the recorded medium along a path of travel past said playback head, said playback head comprising two spaced side-by-side electrodes having their respective faces orientated transversely across the path of travel of the trail and abutting the deposit-free path of the medium.

12. A playback apparatus as set forth in claim 11 wherein the carrier comprises an elongated thin flexible tape formed from plastic and the electrodes are disposed side-by-side across the width of the tape.

13. A playback apparatus as set forth in claim 12 further including means for guiding the tape in a bend formed by the electrode faces.

14. An apparatus for forming a recorded dielectric medium, said apparatus including means for electrostatically charging successive areas on a dielectric carrier, means for depositing quantities of powdered dielectric particles on the successive areas of one face only of the carrier as a function of the change in intensity of the electrostatic charges on said successive areas, the other face of said carrier being left deposit-free, and a station for applying an electrically conductive layer over only the particle-bearing face of the carrier.

15. An apparatus for forming a recorded dielectric medium, said apparatus including means for electrostatically charging successive areas on a flexible dielectric tape, means for depositing quantities of powdered dielectric particles on the successive areas of one face only of the tape as a function of the change in intensity of the electrostatic charges on said successive areas, the other face of said tape being left deposit-free, and a station for applying an electrically conductive flexible layer over only the particle bearing face of the tape.

16. An apparatus for forming a recorded dielectric medium, said apparatus including means for electrostatically charging successive areas on a dielectric carrier, means for depositing quantities of powdered dielectric particles on the successive areas of one face only of the carrier as a function of the change in intensity of the electrostatic charges on said successive areas, the other face of said carrier being left deposit-free, and a station for spraying an electrically conductive layer over only the particle-bearing face of the carrier.

17. A method for reproducing an information signal comprising the steps of:

(a) providing a recorded dielectric medium comprising a thin dielectric carrier, a trail of deposited quantities of dielectric powder particles on the face of the carrier, the other face of the carrier being deposit-free, the transverse cross-section of the trail varying as a function of the information signal, and an electrically conductive layer superposed on the trail of deposited quantities;
(b) feeding said medium through a path of travel by a pair of side-by-side spaced electrodes oriented with the faces of said electrodes athwart and abutting the deposit-free face of the medium to form between the electrodes and conductive layer twin series-connected continuously variable capacitors; and
(c) utilizing the continuously variable capacitors to provide an output signal.

18. A method for reproducing an information signal comprising the steps of:

(a) providing a recorded dielectric medium comprising a thin dielectric carrier, a trail of deposited quantities of dielectric powder particles on a face of the carrier, the other face of the carrier being deposit-free, the transverse cross-section of the trail varying as a function of the information signal, and an electrically conductive layer superposed on the trail of deposited quantities;
(b) feeding said medium through a path of travel by a pair of side-by-side spaced electrodes oriented with the faces of said electrodes athwart and abutting a broad dielectric face of the medium;
(c) forming twin series-connected continuously variable capacitors from one electrode through a portion of the deposit-free face of the dielectric medium abutting the face of said one electrode, through a quantity of deposited dielectric powder particles in registry with said portion of the medium, through the electrically conductive layer and across said medium, through a quantity of deposited dielectric powder particles in registry with a portion of the medium abutting the face of the second electrode, through the latter named portion of the medium, and to the second electrode; and
(d) utilizing the twin continuously variable capacitors to provide an output signal.

19. A method for recording and reproducing an information signal comprising the steps of:

(a) providing a dielectric carrier;
(b) electrostatically charging successive areas on the carrier in accordance with an information signal;
(c) depositing quantities of powder dielectric particles on the successive areas of a face of the carrier as a function of the change in intensity of the electrostatic charges on the successive areas while leaving the other face of the carrier deposit-free;
(d) superposing an electrically conductive layer over the particle-bearing face of the carrier;

(e) feeding the recorded dielectric medium thus formed through a path of travel by a pair of side-by-side spaced electrodes constituting with the medium twin continuously variable capacitors, said electrodes being oriented so that the faces of said electrodes are athwart and abut the deposit-free face of the medium; and (f) utilizing the continuously variable capacitors to provide an output signal.

References Cited

UNITED STATES PATENTS

| | | | |
|---|---|---|---|
| 2,373,273 | 4/1945 | Sziklai | 179—100.1 |
| 3,043,993 | 7/1962 | Maltby | 324—61 X |
| 3,057,966 | 10/1962 | Heller | 346—74 X |

BERNARD KONICK, *Primary Examiner.*

J. F. BREIMAYER, *Assistant Examiner.*